3,081,366
SEALED ALKALINE BATTERY CELL WITH
AUTOMATIC CHARGING CUT-OFF
Louis Belove, Ardsley, N.Y., assignor to Sonotone Corporation, Elmsford, N.Y., a corporation of New York
Filed May 10, 1961, Ser. No. 109,195
2 Claims. (Cl. 136—6)

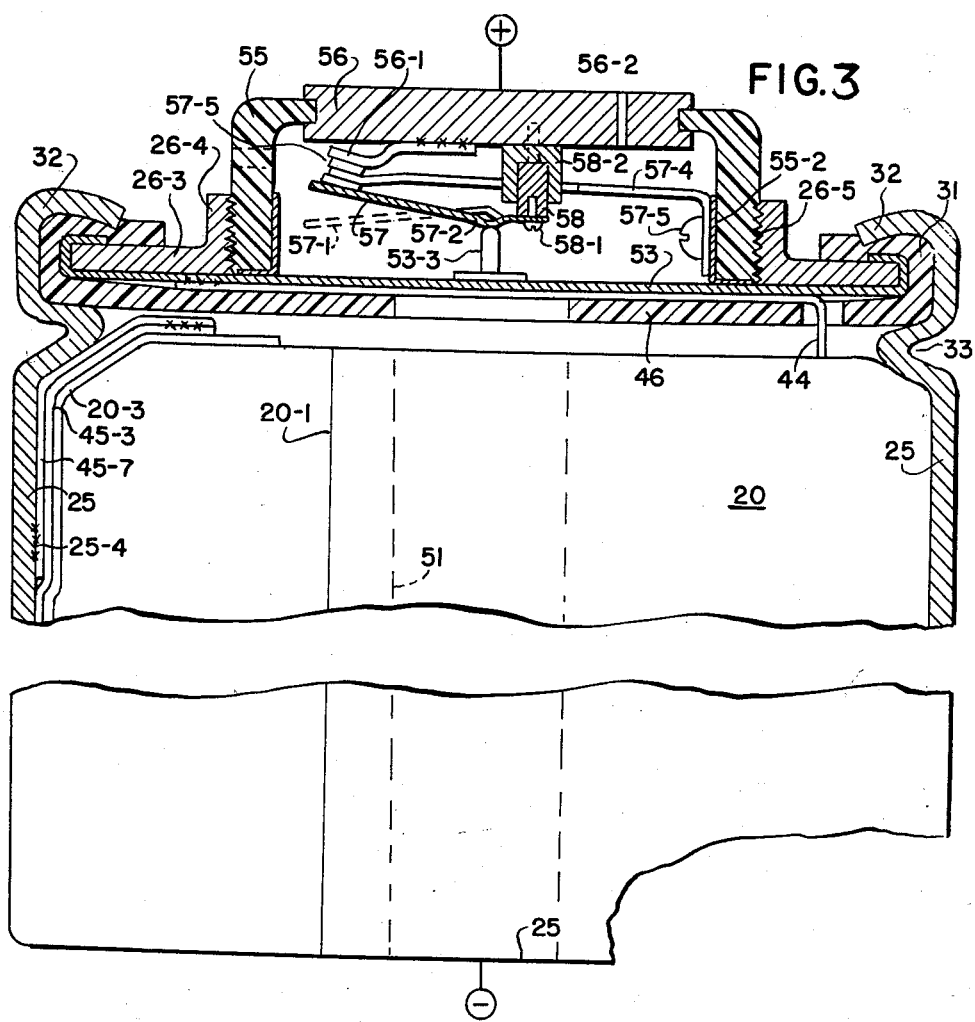

This invention relates to rechargeable electric battery cells, and particularly to hermetically sealed battery cells operating with an alkaline electrolyte, although some aspects of the invention are of broader scope.

The electrode assembly of such sealed cells comprises at least two superposed, opposite-polarity, adjacent sintered electrode plates the pores of which are loaded with active electrode substance, and electrolyte held immobilized or absorbed in pores of the electrode plates and in the pores of the non-conducting or insulating separator layer interposed between the electrode plates. In most cases, such sealed cells may be recharged without developing excessive internal gas pressure, provided the recharging current remains below a limited level. However, occasionally, on recharging a sealed rechargeable alkaline cell, there is developed an excessively high internal pressure which in some cases causes bursting of the cell casing.

Among the objects of the invention is such sealed rechargeable cell which will not permit development of excess internal pressure and prevent cell damage by excessive internal pressure.

In accordance with the invention the sealed metal casing of such cell has a metallic sheet member connected to one cell electrode and having its periphery insulatingly affixed to open casing end and an overlying exposed metallic terminal insulatingly held over the sheet member. A movable switch portion normally connects an intermediate pressure-deflectable sheet member portion to the external terminal and, in response to outward motion of the deflected sheet portion under excess internal pressure the switch portion disconnects the external terminal from the deflected sheet portion.

The foregoing and other objects of the invention will be best understood from the following description of exemplifications thereof, reference being had to the accompanying drawings, wherein:

FIG. 3 is a transverse cross-sectional view on a greatly enlarged scale, of a cell of FIG. 2 having charge-cut-off means exemplifying the invention.

Figures 1, 2:
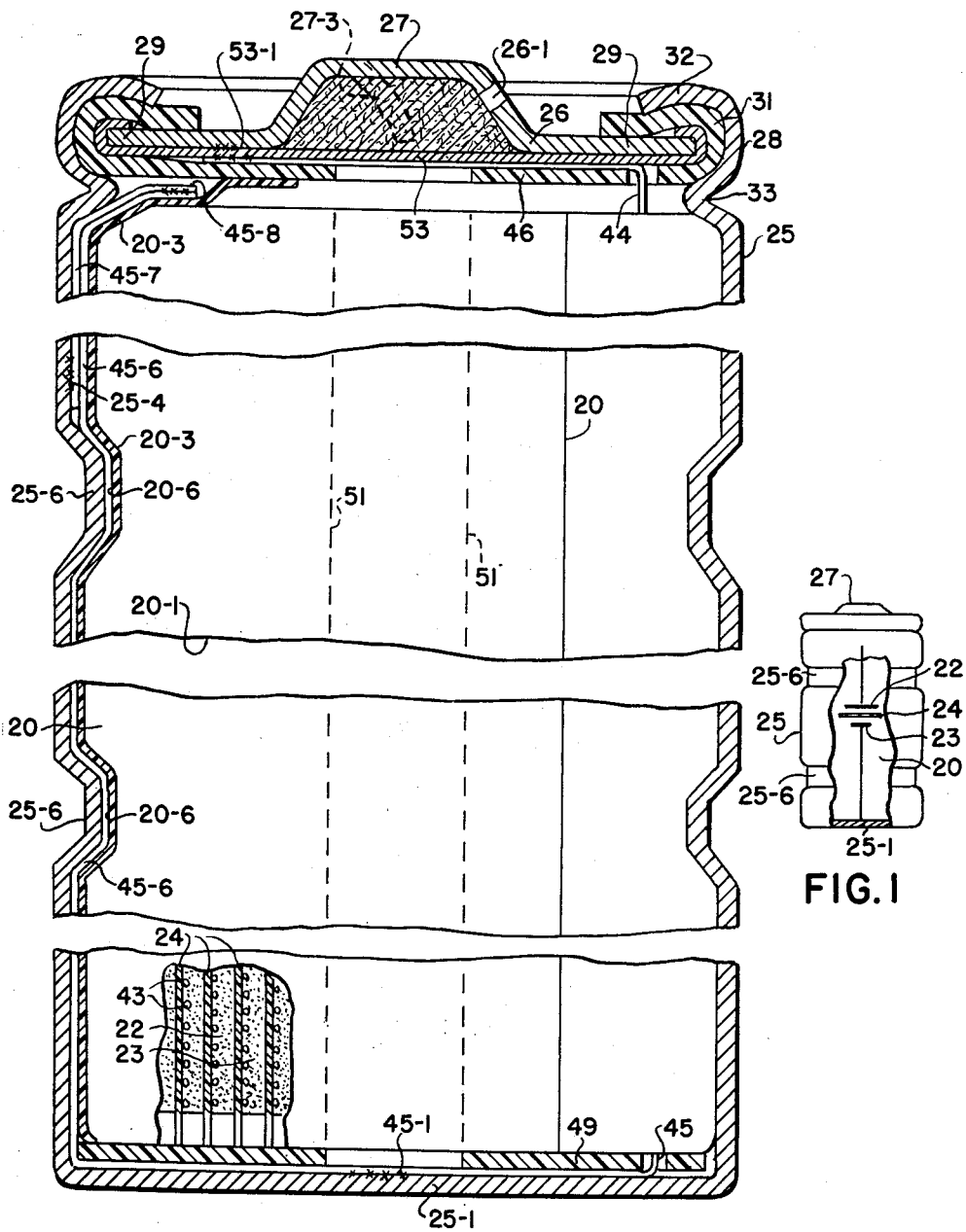
FIG. 1 is an elevational and partially diagrammatic view of one form of battery cell suitable for use with the present invention.
FIG. 2 is a vertical cross-sectional view of the battery cell of FIG. 1, with some parts exaggerated for the sake of clarity.

An exemplification of the invention will now be described in connection with a tubular or cylindrical battery cell of the type suitable for use in conventional flashlights, wherein one or a column of several similar battery cells are held in superposed relation for supplying current to a flashlight bulb, or in generally analogous applications wherein one or an assembly of battery cells are used to supply electric power to a load circuit thereof. However, some aspects of the present invention are applicable to battery cells having cell casings of rectangular, oval or other shapes, as required in different applications thereof.

FIG. 1 shows in elevation and diagrammatically, and FIG. 2 show structurally, one example of a battery cell suitable for use with the invention disclosed herein. The battery cell of FIGS. 1 to 3 is shown as having one pair of superposed electrode plates 22, 23 of opposite polarity, held separated by a porous or microporous, electrically-insulating separator sheet 24 with electrolyte held immobilized or absorbed in the pores of separator 24 and the electrode plates 22, 23. The superposed, opposite-polarity electrodes 22, 23 are shown coiled or wound into a spirally-coiled electrode structure or assembly 20 (FIG. 2) held in the compartment space of a tubular cell casing 25 with the axis of the coiled electrode assembly generally parallel to the major or vertical axis of the metallic, tubular battery casing 25. The electrodes 22, 23 shown are sintered electrode plates, the pores of which are loaded with active positive and negative active electrode substance, in any known way, for instance as described in Koren et al. Patent 2,708,212, and in the article, "Nickel Cadmium Battery Plates," published December 6, 1948, in the Journal of the Electrochemical Society, pages 289–299, volume 94, No. 6. Alkaline batteries of this type operate with a corrosive alkaline electrolyte, such as a 20% to 35% (by weight) solution of potassium hydroxide in water.

The tubular cell casing 25 of metal, although shown as cylindrical in shape, may have rectangular or other shapes. The tubular casing 25 has an integral bottom wall 26, and its top casing opening is enclosed by metallic top wall 27. The metallic top wall 27 may be flat, or as shown, it may have a raised, hollow terminal wall element 28 projecting beyond the inwardly-crimped rim 32 of the casing 25. The rim 29 of top wall 27 is shown hermetically joined to the surrounding casing-opening rim wall 32 across an endless or loop-shaped insulating collar 31 of suitable insulating material, such as nylon or other synthetic resin, held tightly clamped between them. In its original form, the periphery of insulating collar 31 has an L-shaped cross-section, and may be distinct and separate from or form the periphery of insulating separator collar 31 interposed between the top of the electrode assembly 20 and overlying, exposed metallic portions of the cell. To provide the gas-tight, electrically-insulating hermetic-seal junction, the strong, open top casing rim end-portion 32 has spun therein an inward shoulder ridge 33 which underlies the top wall rim 29, and the overlapping insulating collar 31. The relatively strong casing rim 32 of tubular casing 25 is deformed and crimped over the top wall rim 29 and the overlapping portions of insulating collar 31 for holding the top wall rim 29 and the overlapping insulating portions of collar 31 hermetically gas-tight-clamped between the crimped casing rim 32 and the underlying casing shoulder 33.

The electrode assembly of such cell casing may be formed of any type of superposed, porous, properly-loaded sintered metal-powder plates which are separated by an electrolyte-holding porous separator sheet or layer of electrically insulating material such as filter paper. For instance, the electrode assembly may consist of a stack of sintered and loaded electrode plates of one polarity alternately superposed over electrolyte-holding separators and electrode plates of opposite polarity, in the manner shown, for instance, in U.S. Patents 2,379,374 and 2,527,888, or British Patent 214,799 of 1924. In the form of the battery of the invention shown in FIGS. 1 to 3, the electrode assembly is formed of two superposed electrode plates 22, 23 of opposite polarity, and an interposed electrolyte-holding separator sheet 24, which are coiled into a spirally-coiled plate assembly containing at least one-half of one coil turn. By way of example, the specific battery cell shown has the size of a conventional "D" dry battery cell, and its electrode assembly contains such superimposed, opposite-polarity electrode plates 22, 23 coiled into five coil turns fitting tightly within the interior compartment space of the tubular casing 25, and the electrically-conductive outer surface of the outer coil turn of negative electrode plate 23 may make metallic contact with the surrounding inner metallic surface of tubular or cylindrical cell casing 25. In the battery cell shown, the coiled electrode plate 22 is loaded with positive electrode material and constitutes the cell anode, and the coiled opposite-polarity electrode plate 23 is loaded with negative electrode material and constitutes the cell cathode.

As shown in FIG. 2 and in the enlarged detailed view of FIG. 3, the metallic backing grid or foil 43 of each electrode plate 22, 23 is displaced from the central stratum to the exterior convex stratum of the sintered-particle loaded layer 42 of the respective electrode plates, for holding slightly compressed the loaded sintered-particle layer 42 and suppressing escape of any loosened sintered and active electrode particles thereof. In addition, the sintered-particle layer of both electrode plates 22, 23, particularly in the case of sintered layers of substantial thickness such as of the order of 0.020″ and greater, the sintered-particle layer 42 extending along the concave surface of the metallic backing foil 43, is pre-cracked along parallel, adjacent crack lines extending transversely to the side edges of the spirally-coiled electrode plates to suppress irregular cracking of the sintered layers and assure uniform minimum spacing between the superposed spirally-coiled electrode plates of the electrode assembly 20. The just-described features of the electrode assembly 20 constitute the subject-matter and are claimed in the co-pending application of L. Belove, Serial No. 860,609, filed December 18, 1959, as a continuation-in-part of his prior application Serial No. 843,402, filed September 30, 1959, and now abandoned, assigned to the same assignee.

Each of the coiled, sintered electrode plate strips 22, 23 has metallically affixed, as by welding to a transverse edge portion thereof directly to the metallic surface of its backing foil 43, a strip-shaped metallic terminal tab 44, 45, respectively, of flexible sheet metal, such as a soft nickel sheet which is inert to the corrosive alkaline electrolyte. As seen in the cross-sectional detail portion of the electrode assembly 20 shown in FIG. 2, the insulating separator sheets or layers 24 extend beyond the lower and upper transverse edges of the spirally-coiled electrode assembly 20 so as to form upward and downward insulating-layer protrusions projecting beyond the transverse side edges of the spirally-coiled electrode plate strips 22, 23.

As disclosed in U.S. Patent 2,379,374, it is desirable to hold the superposed, opposite-polarity plates of alkaline battery cells tightly compressed across the interposed electrolyte-holding porous insulating separator layer. To hold the spirally-coiled assembly of opposite-polarity electrode plates 22, 23 so compressed against the interposed insulating separator 24, a retainer film strip 20–1 of strong, heat-resistant insulating material such as nylon or other suitable synthetic resin, is wound around the exterior surface of the tightly wound electrode assembly 20.

In the shown electrode assembly 20, the positive electrode tab 44 extends upwardly from the positive electrode plate 24, and the negative electrode tab 45 extends downwardly from the bottom edge of the negative electrode plate 23. Before positioning the coiled electrode assembly 20 within the tubular casing 25 of the cell through the open casing end 32, the upper positive electrode tab 44 is threaded through a relatively large slot of the overlying insulating sheet barrier of suitable synthetic resin material such as nylon, overlying the battery assembly 20. The negative electrode tab 45 of the electrode assembly 20 is similarly threaded through a similar slot in the underlying similar insulating separator sheet barrier 49. Extensions of the positive and negative electrode tabs 44, 45, respectively, extending beyond the slot opening of the insulating barrier sheets 46 and 49, respectively, are metallically affixed, as by electric spot-welding, to metallic portions of or connected to the top positive terminal wall 27 and to the metallic casing 25 which forms the bottom terminal wall of the cell.

The spirally, tightly wound electrode assembly 20 with its negative tab 45 threaded through the slot of the bottom insulating sheet 49 is inserted through the open casing end 32 as seen in FIG. 4, into the interior of the tubular casing 25, before the upper internal casing shoulder 33 is formed in the upper casing portion. Thereupon, the upwardly-projecting end of the positive electrode tab 44 is threaded through the slot of the upper insulating barrier sheet 46, whereupon an upwardly-projecting end portion of the positive electrode tab 45 is secured to a metallic terminal portion through which it is connected to the upper metallic top wall 26 of its terminal portion 27.

Sealed, alkaline cells of the type described above may, in most cases, be recharged without developing excessive gas pressure, provided the recharging current remains below a limited current level. However, in some cases, when recharging such sealed, rechargeable alkaline cells, an excessively high internal gas pressure is developed in the interior, which gas pressure is sufficient to cause uncontrolled or explosive bursting of the cell casing 25. As protection against uncontrolled bursting of the casing of a sealed, alkaline battery cell of the type described above, it has been proposed to form one wall of the gas-tight enclosure casing out of a diaphragm of plastic material, such as polyvinyl chloride, polyethylene, or the like, which is impervious to liquid alkaline electrolyte, but is permeable to and permits passage of hydrogen and to some extent also oxygen, which constitute the gases developed in the casing enclosure of the cell assembly upon recharging, and which prevents development of excessive internal pressure within the casing enclosure. Such plastic diaphragms of the cell casing enclosure, even if made of nylon, are also permeable to water vapor. However, for the full effectiveness of sealed alkaline battery cells of the type described above, it is desirable that the gas and vapor constituents of the relatively small volume of alkaline electrolyte with its water content held absorbed in the pores of the insulating separator layer 24 and the opposite-polarity electrode plates 22, 23 of the assembly, should not be lost from the sealed casing enclosure of the cell assembly 20. Even diaphragms of steel or stainless steel which are sufficiently thin to assure their controlled bursting under controlled, predetermined, limited internal pressure within the casing enclosure of such alkaline cells, are permeable to water vapor and hydrogen.

In accordance with the invention, a sealed, gas-tight enclosure for the electrode assembly held in the metallic cell casing, is formed by uniting with a gas-tight, hermetic seal to the metallic rim of the casing opening, an enclosure sheet of rolled metal which has minimized porosity and prevents or suppresses escape of water vapor and hydrogen from the interior of the gas-tight cell enclosure, such rolled metal sheet having at least one intermediate deflectable sheet section which is sufficiently thin to assure that it is broken open or bursts under predetermined upper level of internal gas pressure, developed within the cell casing enclosure. As an example, good results are obtained with a thin, rolled metal enclosure sheet formed of a soft grade of nickel having an intermediate central section or being throughout of sufficiently small thickness of the order of at most about 0.10″, and sufficiently thin to cause such sheet to burst under a limited pressure, such as not exceeding 500 pounds per square inch (p.s.i.). In practice, good results are obtained with a controllably-bursting enclosure sheet of rolled nickel having a thickness of about 0.006″ to about 0.001″, depending on the maximum internal pressure at which such protective enclosure sheet should burst. With such rolled-metal, gas-tight sheet enclosure for the metallic cell casing 25, only the rim 29 of the top wall 26 forms in conjunction with the underlying rolled-metal burstable enclosure sheet 53, the gas-tight enclosure seal for the casing opening of cell casing 25. In such cell of the invention, the more central portions of the top casing wall 26 have formed therein one or more openings 26–1 or connections to the exterior space, to permit gases and vapor to be released through a controlled burst opening of the rolled-metal enclosure sheet 53 to the exterior space.

Difficulties have been encountered in assuring on a production basis, a gas-tight seal between the clamped insulating sealing layer 31 and the edge regions of the relatively thick top-wall rim 29, and of the underlying thin, burstable, rolled-metal enclosure sheet, and the overlying insulating sealing layer 31 held tightly clamped thereto by the overlapping casing clamping rim 32 and casing shoulder 33. According to the invention, these difficulties are overcome, and gas-tight cell-casing closures are obtained on a production basis, by providing such burstable, rolled-metal enclosure sheet 53 with a wide rim 54 extending materially beyond the edge of the top wall rim 29 and causing the laterally-projecting rim 54 of the rolled-metal enclosure sheet to be tightly clamped in overlapped relation over the edge and peripheral side surfaces of the top-wall rim 29 when the tubular casing rim 32 is crimped over the insulating collar 31, for folding it over and holding them tightly clamped under sealing clamping pressure between the crimped casing rim 32 and the underlying, inwardly-projecting casing shoulder 33. Before the top wall rim 29 is placed within the insulating collar 31 of the cell-component assembly, the wider, thin, gas-tight, rolled-metal enclosure sheet or foil 53 is placed with its wide rim 54 in aligned overlapping relation, shown, under the rim 29 of the top wall 26. The outwardly-projecting rim 54 of the thin, rolled-metal enclosure sheet 53 may first be given, by metal forming, an L-shaped cross-section, as indicated by upwardly-extending, dash-line rim portion 54–5, having such lateral dimension as to fit over the edge of top wall rim 29 and fit within the upwardly-extending rim of the interposed insulating sealing collar 31.

In sealingly affixing, as described above, the top wall rim 29 and the overlapping rim 54 (or 54–1) of underlying, thin, controllably-burstable, rolled-metal enclosure sheet 53 across the interposed insulating collar 31, to the surrounding portions of strong metal casing 25, the thin rolled-sheet rim 54 (or 54–1) is folded and tightly clamped with gas-tight pressure engagement over the edge and the rim surfaces adjoining the edge of the top wall rim 20 by the strong pressure forces applied thereto by the overlying tightly-crimped casing rim 32 and the internal casing shoulder 33, which constitute strong, overlapping clamping structures.

When two superposed, opposite-polarity sintered electrode plates with an interposed porous insulating layer are spirally coiled into an electrode assembly, the resulting electrode assembly has a hollow interior space 51 extending axially lengthwise generally along the axis of the electrode assembly 20, as indicated by dash-line in FIG. 2. Before inserting the electrode assembly 20, into the interior of tubular casing 25, the negative electrode tab strip 45 is folded under the bottom side of the electrode assembly 20, and the insulating sheet 49 with its central sheet opening, so that the bottom terminal tab 45 shall overlap and be exposed through the bottom end of the interior hollow space 51 of the electrode assembly. To provide weld connection between the bottom negative electrode tap strip 45 and the underlying metal casing bottom wall 25–1, an elongated welding terminal rod is inserted through the interior hollow space 51 of the electrode assembly 20 to place it under pressure over the exposed underlying tab portion 45–1 aligned therewith, and produce with a complementary welding electrode plate along the bottom surface of casing bottom wall 25–1 an electric metallic weld connection between the tab portion 45–1 and casing bottom wall 25–1. Although such welds, which might be called "blind" welds, may be checked for quality, by electric resistance and continuity tests, such blind weld connection may nevertheless be mechanically weak and may be further weakened during the long useful life of the cell, particularly if the cell is used in applications where it is subject to vibrations. It has been found that such blind tab-weld connections when so weak or weakened, may have relatively high electric resistance, so that the passage of charging current will develop excessive heat at the casing-weld junction of electrode tab 45–1 and cause such excessively heated tab-weld junction to ignite an explosive gas atmosphere such as hydrogen developed in the casing enclosure while the cell is recharged.

In such cell, the interior space underlying the top wall 26 or its raised top-wall portion 27, is connected to the exterior space through top wall opening 26–1, thereby permitting gases discharged through a burst opening of thin rolled, gas-tight sheet 53 to escape to the exterior space. This interior top wall space may be filled with a damping material, for instance a fibrous material such as glass wool, for damping and reducing the level of the sound caused by the outflow of gas through a burst opening of the thin rolled sheet wall 53 of the casing enclosure to the exterior space.

With a sealed cell of the invention of the type described above, excess internal pressure developed within the sealed casing enclosure while recharging the cell, will cause the thin rolled, gas-tight metal sheet 53 to burst open under predetermined selected upper pressure level. For example, with a hermetic casing enclosure of the electrode assembly having a thin, gas-tight, rolled-metal sheet 53 of soft nickel, with a thickness of the order of 0.001", and secured with a gas-tight insulating joint to the casing opening of metal casing 25, the sheet 53 will burst if excess pressure in the interior of the casing enclosure exceeds about 170 p.s.i. Where it is desired to cause such thin, gas-tight, rolled-metal sheet to burst open at a higher pressure, such as 300 p.s.i., the thickness of its central sheet section may be correspondingly increased to a selected thickness in the range up to 0.008".

In operation, when a sealed alkaline cell of the type described above is being recharged and develops during such recharge, a pressure in excess of 170 p.s.i., a thin, gas-tight, rolled-metal sheet enclosure 53 of such cell casing will burst open and release the gases if the thickness of such rolled-metal sheet is 0.001".

Metals other than nickel may be used for forming gas-tight casing enclosures with a burstable, thin, gas-tight, rolled-metal enclosure sheet of the casing enclosure. As an example, such controllably-bursting enclosure sheet 53 may be formed of thin sheets of steel which is coated with a tightly-adhering coating of nickel, as by an electroplating process, with the composite sheet rolled, if necessary, to give it the desired gas-tightness and the desired small thickness.

FIG. 3 is a cross-sectional view similar to FIG. 2, of a sealed alkaline battery cell, the casing enclosure of which has a similar thin, gas-tight, metallic pressure-deflectable enclosure sheet which instead of bursting under a predetermined level of internal pressure, operates to disconnect the charging circuit through which the battery cell is charged. The cell of FIG. 3 is identical with that described in FIGS. 1 to 2, except for the differences described below.

Instead of cover terminal wall 26 of the cell of FIGS. 1 and 2, the cell of FIG. 3 has a similar, strong metallic top-wall rim 26–3 the outer edge region of which is joined by a tightly-clamped, gas-tight insulating sealing joint including an insulating collar 31 overlappingly clamped thereto by the crimped casing rim 32 and internal casing shoulder 33, as in the similar gas-tight joint of FIGS. 1 and 2. The top-wall rim 26–3 is adjoined by an integral, upwardly-extending inner flange 26–4 to which is united the downwardly-extending, strong, tubular insulating rim 55 of a strong, metallic top terminal wall 56 serving in the particular cell shown as the exposed, upper, positive terminal of the cell. The top terminal wall 56 may be molded in with its insulating, tubular rim 55, as an integral, relatively strong, insulated terminal structure, although no gas-tight joint is required along the junction between the metallic terminal 56 and its insulating rim 55. Although the top-wall rim 26–3 may be joined to the insulating collar 55 and the upper terminal wall 56 as part of a single, integrally-molded structure, the top terminal wall 56 with its insulating rim 55 is shown formed as a separate unit which is held suitably affixed as by cement, heat-sealing, or by a bayonet or threaded joint 26–5, as indicated in FIG. 5.

Along its downwardly-facing surface, the metallic terminal wall 56 carries a movable metallic spring switch arm 57, actuatable from the full-line, closed position shown, to the dash-line, open position 57–1 for selectively opening or closing a cell-charging circuit through which the cell is recharged from a charging source indicated by an encircled plus (+) terminal and an encircled minus (−) terminal shown connected to the positive top terminal wall 56 and negative casing wall terminal 25 of the cell, respectively. The enclosure space of the top terminal wall 56 and its rim 55, in which switch 57 operates, is connected to the exterior space, as by a vent passage 56–2 in the top wall or in its rim 55. Switch 57 has an anchor end secured, as by a screw 58–1, to a metallic anchor portion 58 which may, for instance, be fixed, as by being held molded within an insulating block 58–2 which is suitably secured as by cement or screws to the overlying metallic top terminal 56.

Switch 57 may be of any of the known types of microswitches, and is shown, for instance, as a microswitch of the type described in U.S. Patent 2,340,615, having a control portion 57–2 which when actuated upwardly by an actuating pin 53–3 of the deflectable diaphragm sheet 53, will cause switch 57 to move abruptly from the closed position shown, to the open, deflected, dash-line position 57–1. In the particular switch 57 shown, the control region of its control portion 57–2 is somewhat wider than the movable end portion thereof, and has its central control portion 57–2 dished in downward direction while its two side-arm portions are deflected in opposite direction, as shown, to give it the desired abrupt opening and closing movements. The contact end portion of switch 57 may be arranged so that in the closed position shown, it makes contact directly with a downwardly-facing portion of terminal end wall 56, or with an inward, metallic terminal portion 56–1 thereof secured to or extending therefrom.

The switch actuating pin 53–3 is of metal, and as shown, may have a thin, flat base which is secured as by silver solder, for instance, to the underlying central portion of the thin, rolled-metal, deflectable closure sheet 53, so that—under a predetermined internal gas pressure—outward deflection of the central portion of the closure sheet 53 will cause actuating pin 53–3 to actuate the control portion 57–2 of the switch for imparting thereto abrupt opening movement from the full-line, closed position 57 to the open dash-dot-line position 57–1, thereby opening the charging circuit. As soon as the internal gas pressure within the casing enclosure 25, 53 drops to a level below the switch-opening pressure, the returning motion of the push-pin 53–3 towards its normal position shown, will release switch-arm control portion 57–2, thereby causing switch arm 57 to return from the open, dash-line position 57–1 to its full-line, closed position 57 in which the cell-charging circuit is restored.

In all its positions, the metallic push-pin 53–3 which is metallically connected to the thin, deflectable, metallic closure sheet 53, is connected through electrode tab 44 to the positive cell electrode, thereby completing at its contact connection with top terminal switch contact 56–1, the charging circuit from the charging source (+) −(−). With this arrangement of switch 57, on development of excess internal gas pressure by the charging current, the upward movement of the deflectable, thin closure sheet 53 with its actuating pin 53–3 will actuate the switch 57 from the closed position to the open dash-line position 57–1, thereby opening the charging circuit, and switch 57 will re-close the charging circuit when reduced internal gas pressure of the cell enclosure permits the deflected, thin sheet 53 to return to a proper, more inward position.

The upper part of the switch actuating pin 53–3 may form a transverse, elongated contact member of a width equal to the width of the switch-control portion 57–2 engaged thereby, for providing a larger contact surface for contact engagement therewith than just merely a pin-end contact surface.

When a relatively large charging current is required, an additional auxiliary current-carrying, metallic spring switch arm 57–4 may be provided and arranged to move with main switch arm 57 to make a large-capacity circuit connection between top-wall switch contact 56–1 and the positive cell electrode plate, when the main switch arm 57 is in the full-line closed position shown, and to open the additional current-carrying circuit when switch arm 57 is abruptly actuated to the open, dash-line position 57–1. Auxiliary metallic switch arm 57–4 is formed of a springy metal strip of required current-carrying capacity, for instance, beryllium copper. It may have an anchor portion 57–5 suitably secured, as by a rivet or screw, to an underlying metallized surface 55–2 on the interior of the insulating rim 55 which extends to the downwardly-facing rim surface of the rim, where it is engaged by and makes metallic connection with the underlying surface of thin, deflectable closure sheet 53 and therethrough to positive electrode plate or plates. Switch spring arm 57–4 has a free contact end portion 57–6 which overlies and follows the contact end portion of main switch arm 57 and is held thereby in its closed position shown, in pressure contact engagement with the overlying top wall contact portion 56–1 of the charging circuit. This auxiliary spring switch-arm 57–4 is of limited stiffness and is biased so that its contact 57–5 follows the abrupt movement of main switch 57 from its full-line position to the dash-line position 57–1, so that switch contact 57–5 of auxiliary switch 57–4 opens its contact engagement with top terminal switch contact 56–1 when the main switch 57 is actuated from its full-line, closed position, to the dash-line open position 57–1 for also abruptly opening the auxiliary, high-capacity charging circuit under predetermined upper level of internal gas pressure when push-pin 53–3 of deflected, thin sheet 53 actuates main switch 57 to the dash-line, open position 57–1. When reduced internal gas pressure returns main switch 57 to the closed, full-line position, it brings the contact end 57–5 of auxiliary switch arm 57–4 to the closed position shown, wherein the higher-capacity charging circuit is restored. As indicated in FIG. 5, the central portion of auxiliary switch 57–4 (shown in cross-section) may be wider than its end portion and have a central opening through which the anchor support 58–2 of main switch 57 passes.

The present invention relates to a sealed rechargeable cell having a metallic sheet member connected to a cell electrode and its periphery insulatingly affixed to the open casing end and an overlying external terminal insulatingly held over the sheet member. A moveable switch, which normally connects the external terminal to a pressure deflectable sheet portion of the sheet member responds to deflection thereof under excess internal pressure to break the charging circuit connection with the external terminal. Other features of the invention disclosed herein are claimed in the copending applications Serial Nos. 109,196, 109,197, and 120,458 all assigned to the assignee of the present application.

It will be apparent to those skilled in the art that the novel principles of the invention disclosed herein in connection with the specific exemplifications thereof, will suggest various other modifications and applications of the same. It is accordingly desired that in construing the breadth of the appended claims, they shall not be limited to the specific exemplifications of the invention described herein.

I claim:

1. In a sealed, rechargeable storage battery cell, an electrode assembly having one cell electrode and at least one other opposite-polarity cell electrode with electrolyte held between said electrodes and tending to develop gases upon recharging said cell, a metallic casing enclosing said electrode assembly and comprising a tubular casing constituting one cell terminal member connected to one of said electrodes, a metallic sheet member connected to the other of said electrodes and being affixed along its periphery to the adjacent periphery of said tubular casing member by a gas-tight junction region and constituting therewith a gas-tight enclosure around said electrode assembly, said junction region including an insulating sheet member overlapping the peripheral sheet edge region of said sheet member and electrically insulating it from said tubular casing member, said sheet member having a relatively thin intermediate actuating sheet section deflectable to the exterior by gas pressure within said enclosure, a metallic external terminal held insulatingly fixed by said junction region spaced from the exterior of said actuating sheet section, and movable switch structure carried by said cell between said sheet section and said external terminal, said switch structure having a movable switch actuating portion normally contacting said actuating sheet portion and a switch contact portion normally connected to said switch actuation portion and contacting a contact portion of said external terminal, and means responsive to outward motion of said actuation sheet section under excessive internal casing gas pressure for imparting outward motion to said switch actuating portion and means responsive to outward motion of said switch actuating portion to cause said switch contact portion to break its contact with said exernal terminal.

2. In a sealed, rechargeable storage battery cell, an electrode assembly having one cell electrode and at least one other opposite-polarity cell electrode with electrolyte held between said electrodes and tending to develop gases upon recharging said cell, a metallic casing enclosing said electrode assembly and comprising a tubular casing constituting one cell terminal member connected to one of said electrodes, a metallic sheet member connected to the other of said electrodes and being affixed along its periphery to the adjacent periphery of said tubular casing member by a gas-tight junction region and constituting therewith a gas-tight enclosure around said electrode assembly, said junction region including an insulating sheet member overlapping the peripheral sheet edge region of said sheet member and electrically insulating it from said tubular casing member, a thin deformable metallic sheet underlying and having its periphery affixed by said gas tight junction region joined to the periphery of said sheet member, said thin metallic sheet having a relatively thin intermediate actuating sheet section deflectable to the exterior by gas pressure within said enclosure, a metallic external terminal held insulatingly fixed by said junction region spaced from the exterior of said actuating sheet section, and a movable switch structure carried by said cell between said sheet section and said external terminal, said switch structure having a movable switch actuating portion normally contacting said actuating sheet portion and a switch contact portion normally connected to said switch actuation portion and contacting a contact portion of said external terminal, and means responsive to outward motion of said actuation sheet section under excessive internal casing gas pressure for imparting outward motion to said switch actuating portion and means responsive to outward motion of said switch actuating portion to cause said switch contact portion to break its contact with said external terminal.

References Cited in the file of this patent
UNITED STATES PATENTS

| | | |
|---|---|---|
| 2,463,565 | Ruben | Mar. 8, 1949 |
| 2,525,436 | Williams | Oct. 10, 1950 |
| 3,002,042 | Rowe | Sept. 26, 1961 |